United States Patent
Ilnicki et al.

(10) Patent No.: US 6,898,977 B2
(45) Date of Patent: May 31, 2005

(54) ULTRASONIC DISTANCE-MEASURING METHOD AND DEVICE

(75) Inventors: Gregor Ilnicki, Barsighausen (DE); Mark-Holger Paulmann, Hannover (DE)

(73) Assignee: WABCO GmbH & Co. OHG, Hannover (DE)

( * ) Notice: Subject to any disclaimer, the term of this patent is extended or adjusted under 35 U.S.C. 154(b) by 25 days.

(21) Appl. No.: 10/219,789

(22) Filed: Aug. 15, 2002

(65) Prior Publication Data

US 2003/0051552 A1 Mar. 20, 2003

(30) Foreign Application Priority Data

Sep. 14, 2001 (DE) .......................... 101 45 292

(51) Int. Cl.⁷ .................... G01N 29/00; G01S 15/00
(52) U.S. Cl. ........................ 73/602; 73/629; 367/95
(58) Field of Search ........................ 367/95, 99–101; 73/596, 597, 599, 602, 614; 33/263, 264, 286; 280/427, 477, 478.1, 504, 511

(56) References Cited

U.S. PATENT DOCUMENTS

| | | | |
|---|---|---|---|
| 4,524,356 A | | 6/1985 | Kodera et al. |
| 4,551,722 A | | 11/1985 | Tsuda et al. |
| 4,606,015 A | | 8/1986 | Yamaguchi |
| 4,905,207 A | * | 2/1990 | Fellinger et al. ............... 367/99 |
| 5,177,711 A | | 1/1993 | Yamaguchi et al. |
| 6,480,104 B1 | * | 11/2002 | Wall et al. ................... 340/431 |
| 6,490,227 B2 | * | 12/2002 | Nagai et al. ................... 367/99 |

FOREIGN PATENT DOCUMENTS

| | | |
|---|---|---|
| DE | 29-07-582 B1 | 8/1980 |
| DE | 34-05-915 A1 | 8/1985 |
| DE | 35-13-270 A1 | 10/1986 |
| DE | 196-07-788 A1 | 9/1997 |
| DE | 197-44-185 A1 | 4/1999 |
| GB | 2315628 | 2/1998 |
| JP | 58050484 A | 3/1983 |
| JP | 62064973 | 3/1987 |

* cited by examiner

*Primary Examiner*—Helen Kwok
(74) *Attorney, Agent, or Firm*—Kramer Levin Naftalis & Frankel LLP

(57) ABSTRACT

An ultrasonic distance-measuring method and device using variable-length transmitted pulses. For this purpose, the length of each of the transmitted pulses is adjusted such that it is approximately proportional to the measured time interval of a transmitted pulse between the transmitter and an obstruction or object. The method can be used in particular for measuring the distance between the rear panel of a utility vehicle and a loading platform.

20 Claims, 2 Drawing Sheets

ULTRASONIC DISTANCE-MEASURING METHOD AND DEVICE

BACKGROUND OF THE INVENTION

The invention relates to an ultrasonic distance-measuring method and device.

A known ultrasonic distance-measuring method is disclosed, for example, in German Patent 19744185 A1, which describes the use of a plurality of ultrasonic transducers in an ultrasonic distance-measuring method for passenger cars. The same transducers are used for both transmission and reception. Long transmitter pulses are used for large ranges and short transmitter pulses for short ranges. The pulse length can be toggled. The short pulse lengths belong to a sequential operation, whereas the long pulse lengths are used during simultaneous operation of a plurality of ultrasonic transducers. Alternatively, long pulses can also be used if no echo has been detected with short pulses.

A disadvantage of the known arrangement is that the pulse lengths are indeed optimized for both short and long distances, but can be unfavorable for intermediate distances. In this situation, the decay behavior (diagnosis echo) of the ultrasonic generator used can have a negative influence since, if it lasts too long, the diagnosis echo can mask reflected pulses of near objects.

From German Patent 19607788 A1, it is further known that ultrasonic distance measurement can be used in a vehicle reversing toward an obstruction. If an obstruction is detected in this way, the vehicle speed in a first range of distance to the obstruction is limited by control of the power of the drive unit of the vehicle, while in a second range of distance, braking force is built up in the wheel brakes of the vehicle.

SUMMARY OF THE INVENTION

Generally speaking, an ultrasonic distance-measuring method is provided which delivers optimal measured results for all distances between a vehicle and an object or obstruction.

In a first aspect of the present invention, an ultrasonic distance-measuring method is provided including the steps of using at least one ultrasonic transmitter/receiver having at least one oscillator to transmit a plurality of variable-length ultrasonic pulses to an object and receive reflected ultrasonic pulses, determining for each of the plurality of transmitted pulses a transit time, regulating a length of each of the plurality of transmitted pulses such that the length of each of the plurality of transmitted pulses is approximately proportional to the transit time of a preceding transmitted pulse, and receiving for at least one transmitted pulse of the plurality of transmitted pulses a first useful echo reflected from the object. An ultrasonic distance-measuring device in accordance with the present invention is also provided.

In another aspect of the present invention, an ultrasonic distance-measuring method is provided including the steps of using at least one ultrasonic transmitter/receiver having at least one oscillator to transmit a plurality of variable-length ultrasonic pulses to an object and receive reflected ultrasonic pulses, determining for each of the plurality of transmitted pulses a transit time, receiving at least one diagnosis echo having a first length and duration, the diagnosis echo corresponding to at least one transmitted pulse of the plurality of transmitted pulses, regulating a length of each of the plurality of transmitted pulses such that the duration of the at least one diagnosis echo is approximately proportional to the transit time of a preceding transmitted pulse, and receiving for at least one transmitted pulse of the plurality of transmitted pulses a first echo reflected from the object. An ultrasonic distance-measuring device in accordance with this aspect of the present invention is also provided.

In still another aspect of the present invention, a pulse length of an ultrasonic transmitter according to the invention is adapted progressively and approximately continuously to the distance to the obstruction to achieve an adaptive and particularly accurate distance measurement in the entire measurement range, which can be between 10 cm and 5 m, for example. Consequently, even the registration of such broad measurement ranges with sufficiently high measurement accuracy is no longer a problem.

Accordingly, an object of the present invention is to provide an ultrasonic distance-measuring method and device that deliver optimal measured results for all distances between a vehicle and an object or obstruction.

Another object of the present invention is to provide an ultrasonic distance-measuring method and device that regulate the lengths of transmitted pulses such that the length of each of the transmitted pulses is approximately proportional to the transit time of a preceding transmitted pulse.

Yet another object of the present invention is to provide an ultrasonic distance-measuring method and device that detect a diagnosis echo and regulate the lengths of transmitted pulses such that the length of the diagnosis echo is approximately proportional to the transit time of a preceding transmitted pulse.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
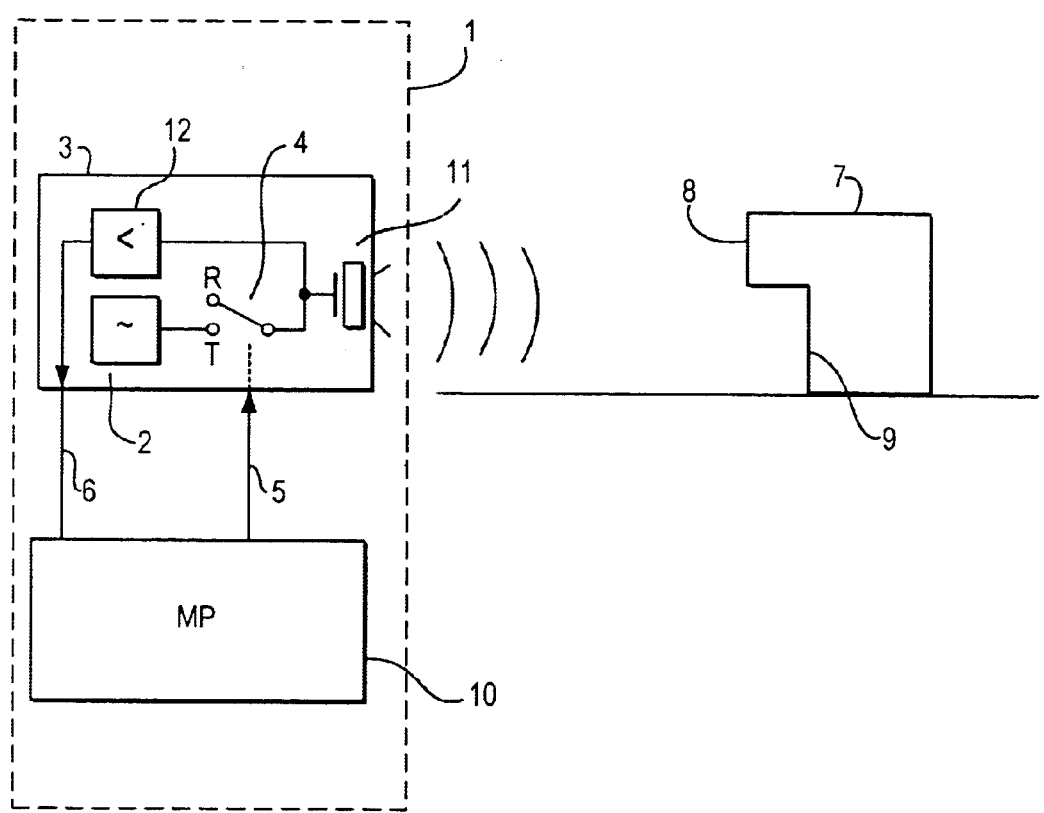
FIG. 1 illustrates, in schematic diagram form, an ultrasonic distance-measuring device.

An ultrasonic distance-measuring device 1 is illustrated schematically as a block diagram in FIG. 1. As an example, device 1 is mounted on the rear panel of a utility vehicle, which is reversing toward an obstruction or object 7 such as a loading platform. In order to regulate the speed of approach of the vehicle toward obstruction 7 and to prevent the vehicle from colliding with front edge 8 of the obstruction or with wall 9 of the obstruction, sound pulses are emitted by means of an ultrasonic transmitter/receiver 3 in the direction of obstruction 7, and the reflected echo is evaluated. For this purpose a quartz resonator 11 is contained in transmitter/receiver 3.

For transmission, an oscillator 2, preferably a constantly oscillating oscillator, with a transmission frequency of, for example, 50 kHz can be connected via a switch 4 to quartz resonator 11. Switch 4 is used to toggle transmitter/receiver 3 between a transmit position ("T") and a receive position ("R"). The respective position of switch 4 can be controlled by electronics 10 with microprocessors (MP) via a line 5.

Excitation of ultrasonic transmitter/receiver 3 takes place preferably with a constant amplitude, which is optimally adapted for the respective quartz resonator. The pulse length can be adjusted via switch 4 to values of, for example, between 80 and 450 microseconds. In position T of switch 4, amplifier 12 is protected against over-excitation by suitable measures.

To minimize costs, quartz resonator 11 is simultaneously used for the reception of echoes reflected from obstruction 7. For this purpose, switch 4 is disconnected from position T and switched to position R. Referring again to FIG. 1, the received echo is amplified in amplifier 12 and is then directed via line 6 to electronics 10 and evaluated therein. In particular, the transit time $T_1$ and transit time $T_a$ of the transmitted pulse $T_s$ to obstruction 7 and back are evaluated and converted to a distance by electronics 10 and microprocessor (MP).

Figure 2A:
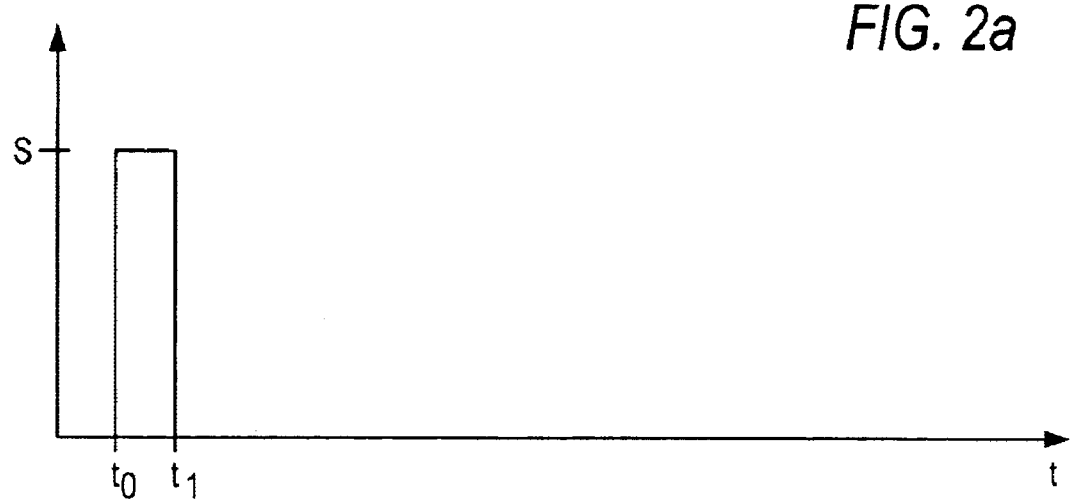
FIG. 2 illustrates, in graphical form, a transmitted pulse (S) plotted against time (t)
FIG. 2b illustrates, in graphical form, echoes (E) received on the basis of the transmitted pulses (S) plotted against time (t).

In FIG. 2a, the form of a transmitted pulse S is plotted schematically versus time t. As is evident from FIG. 2a, switch 4 is switched to position T (transmit) at time $t_0$. In this operating condition, quartz resonator 11 is connected to oscillator 2, whereby the transmitted pulse is generated. This has a length of several oscillations (such as 5) of quartz resonator 11 contained in ultrasonic transmitter/receiver 3. At time $t_1$, switch 4 is switched over to position R (receive) to receive the reflected sound pulses. The received sound pulses (meaning those reflected from obstruction 7) are then directed to amplifier 12 as well as electronics 10 after expiration of a transit time.

Figure 2B:
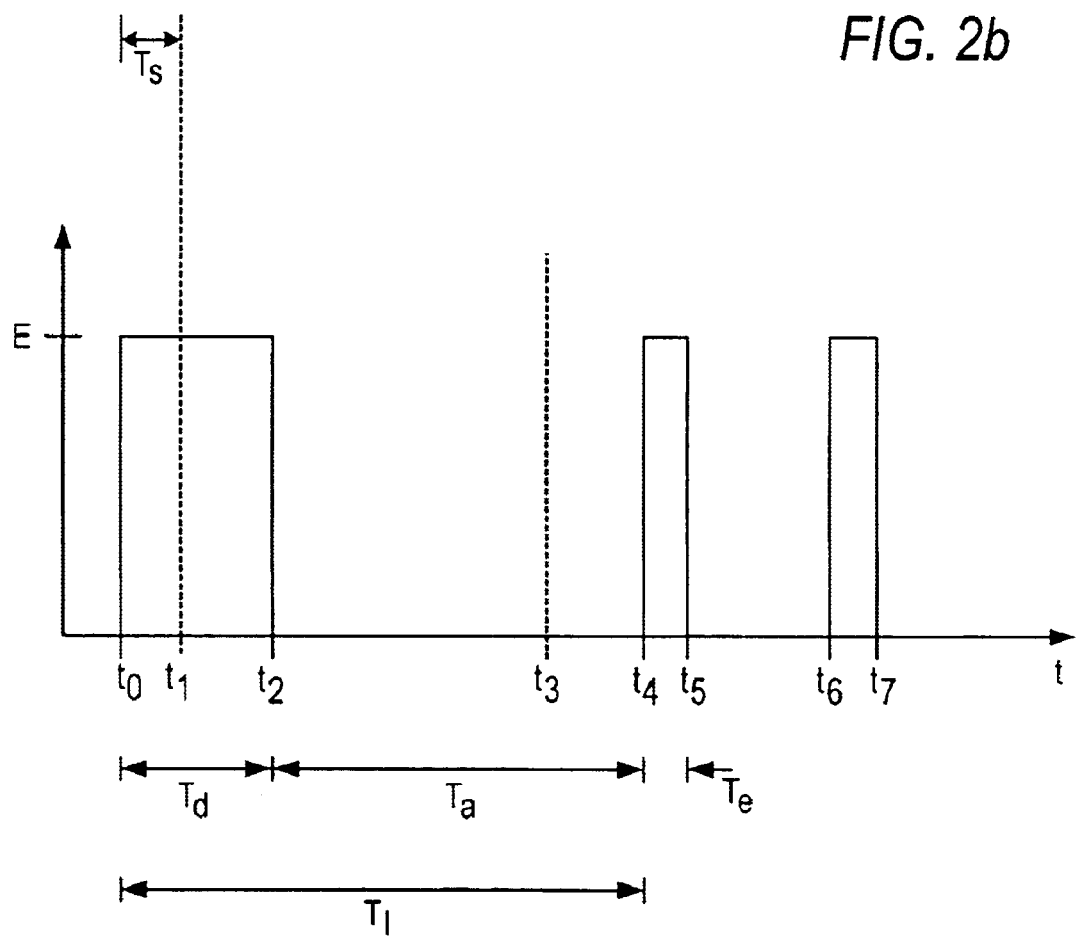

In FIG. 2b, the various echoes (E) received by transmitter/receiver 3 are plotted schematically versus time t. For more clarity, the amplitudes of the echoes are illustrated here as constant, although this is not the case in reality. It is evident that a "diagnosis echo" of length $T_d$ is received between times $t_0$ and $t_2$. This originates from the fact that, after oscillator 2 has been disconnected or separated from built-in quartz resonator 11, post-excitation oscillations of resonator 11 continue for a period of time, which also generating output pulses. However, the diagnosis echo is not evaluated, since it does not arise from an echo reflected from an obstruction (useful echo). This is ensured by a timer (not illustrated), which is contained in evaluation electronics 10 and which permits evaluation of the reflected sound pulses only after expiration of a time $t_3$, or in other words after decay of the diagnosis echo.

The first reflected useful echo, which can be reflected from front edge 8 of obstruction 7, for example, appears at time $t_4$. The useful echo has a length $T_e$ and decays again at time $t_5$. A further useful echo, which can be reflected from wall 9, for example, appears at time $t_6$ and decays at time $t_7$.

According to a preferred embodiment of the present invention, the distance between ultrasonic distance-measuring device 1 and obstruction 7 can be determined by evaluating the transit time $T_1$ between the start time $t_0$ of transmitted pulse S and the arrival time $t_4$ of the first useful echo. For this purpose, the time $t_0$ at which switch 4 is turned to position T is registered by electronics 10. The associated distance will be determined in electronics 10 by known, suitable means.

The distance can also be measured, however, by evaluating the transit time $T_a$ between ending time $t_2$ of the diagnosis echo and start time $t_4$ of the first useful echo. In this connection, it is known that the length $T_d$ of the diagnosis echo increases with the length $T_s$ of the transmitted pulse S.

According to a preferred embodiment of the invention, the length $T_s$ of the transmitted pulse S is variable and is regulated by means of electronics 10 such that each transmitted pulse S is approximately proportional to the transit time $T_1$ or transit time $T_a$ of the preceding transmitted pulse S from transmitter/receiver 3 and back.

Alternatively, the length of transmitted pulse $T_s$ is regulated such that the length $T_d$ of the diagnosis echo is approximately proportional to the transit time $T_1$ or transit time $T_a$ of the preceding transmitted echo. The length $T_d$ of the diagnosis echo depends on the length of the transmitted pulse $T_s$ and on the quartz resonator 11 used. The length of $T_d$ can also be determined experimentally.

In both cases, therefore, the length $T_s$ of the transmitted pulses increases with the measured transit time $T_1$ or transit time $T_a$ of the useful echo.

In an alternative embodiment, electronics 10 can also be programmed such that, at a ratio $(T_a/T_s)$ greater than a limit value B, the pulse length $T_s$ is increased up to a maximum value, at a ratio $(T_a/T_s)$ between two limit values A and B, the pulse length $T_s$ is maintained constant, and at a ratio $(T_a/T_s)$ smaller than a limit value A, the pulse length $T_s$ is decreased to a minimum value, limit value A being smaller than limit value B.

In a further alternative, the method can be designed such that, at a ratio $(T_a/T_d)$ greater than a limit value B, the pulse length $T_s$ is increased up to a maximum value, at a ratio $(T_a/T_d)$ between two limit values A and B, the pulse length $T_s$ is maintained constant, and at a ratio $(T_a/T_d)$ smaller than a limit value A, the pulse length $T_s$ is decreased to a minimum value, limit value A being smaller than limit value B.

For this purpose limit value A is about 0.8, limit value B is about 1.2, the maximum value is about 400 microseconds and the minimum value is about 80 microseconds.

The increases and/or decreases mentioned in the foregoing can take place rapidly or slowly. The computations necessary for this purpose will be performed within electronics 10.

The inventive method can be used expediently for measuring the distance between a reversing utility vehicle and an obstruction. It can also be used in general, however, for regulation of the approach of an object toward an obstruction.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ultrasonic distance-measuring method comprising the steps of transmitting a plurality of variable-length ultrasonic pulses to an object using at least one ultrasonic transmitter/receiver having at least one oscillator and receiving reflected ultrasonic pulses therefrom, determining for each of the plurality of transmitted pulses the transit time, regulating the length of each of the plurality of transmitted pulses such that the length of each of the plurality of transmitted pulses is approximately proportional to the transit time of the preceding transmitted pulse, and receiving for at least one transmitted pulse of the plurality of transmitted pulses a first useful echo reflected from the object after the transit time of the at least one transmitted pulse.

2. An ultrasonic distance-measuring method comprising the steps of transmitting a plurality of variable-length ultrasonic pulses to an object using at least one ultrasonic transmitter/receiver having at least one oscillator and receiving reflected ultrasonic pulses therefrom, determining for each of the plurality of transmitted pulses the transit time, receiving at least one diagnosis echo having a first length, the diagnosis echo corresponding to at least one transmitted pulse of the plurality of transmitted pulses, regulating the length of each of the plurality of transmitted pulses such that the length of the at least one diagnosis echo is approximately proportional to the transit time of the preceding transmitted pulse, and receiving for at least one transmitted pulse of the plurality of transmitted pulses a first echo reflected from the object after the transit time of the at least one transmitted pulse.

3. The method according to claim 1, further comprising the steps of increasing the pulse length of at least one of the plurality of transmitted pulses to a maximum value when the ratio of the length of the transit time of the preceding transmitted pulse to the length of the preceding transmitted pulse is greater than a first limit value, maintaining constant the pulse length of the at least one of the plurality of transmitted pulses when the ratio of the length of the transit time of the preceding transmitted pulse to the length of the preceding transmitted pulse is between a second limit value and the first limit value, and decreasing the pulse length of the at least one of the plurality of transmitted pulses to a minimum value when the ratio of the length of the transit time of the preceding transmitted pulse to the length of the preceding transmitted pulse is smaller than the second limit value.

4. The method according to claim 3, wherein the second limit value is less than the first limit value.

5. The method according to claim 2, further comprising the step of increasing the pulse length of at least one of the plurality of transmitted pulses to a maximum value when the ratio of the length of the transit time of the preceding transmitted pulse to the length of the diagnosis echo is greater than a first limit value, maintaining constant the pulse length of the at least one of the plurality of transmitted pulses when the ratio of the length of the transit time of the preceding transmitted pulse to the length of the diagnosis echo is between a second limit value and the first limit value, and decreasing the pulse length of the at least one of the plurality of transmitted pulses to a minimum value when the ratio of the length of the transit time of the preceding transmitted pulse to the length of the diagnosis echo is smaller than the second limit value.

6. The distance-measuring method according to claim 5, wherein the second limit value is less than the first limit value.

7. The method according to claim 1, wherein the distance between a reversing utility vehicle and the object is measured.

8. The method according to claim 2, wherein the distance between a reversing utility vehicle and the object is measured.

9. The method according to claim 1, wherein the transit time of a transmitted pulse of the plurality of transmitted pulses is measured between a start time of the transmitted pulse and the detection of a first useful echo.

10. The method according to claim 2, wherein the transit time of a transmitted pulse of the plurality of transmitted pulses is measured from an ending time of the diagnosis echo and the detection of a first useful echo.

11. In an ultrasonic measuring device having at least one transmitter and receiver and at least one oscillator and resonator to transmit ultrasonic signals to an object and receive ultrasonic signals reflected from the object, a method of regulating the length of ultrasonic signals transmitted to the object based on the distance between the object and the device comprising the steps of transmitting a plurality of variable-length ultrasonic pulses to an object, determining for each of the plurality of transmitted pulses the transit time, and regulating the length of each of the plurality of transmitted pulses such that the length of each of the plurality of transmitted pulses is approximately proportional to the transit time of the preceding transmitted pulse.

12. The method according to claim 11, further comprising the step of increasing the pulse length of at least one of the plurality of transmitted pulses to a maximum value when the ratio of the length of the transit time of the preceding transmitted pulse to the length of the preceding transmitted pulse is greater than a maximum limit value.

13. The method according to claim 11, further comprising the step of maintaining constant the pulse length of at least one of the plurality of transmitted pulses when the ratio of the length of the transit time of the preceding transmitted pulse to the length of the preceding transmitted pulse is between a minimum limit value and a maximum limit value.

14. The method according to claim 11, further comprising the step of decreasing the pulse length of at least one of the plurality of transmitted pulses to a minimum value when the ratio of the length of the transit time of the preceding transmitted pulse to the length of the preceding transmitted pulse is smaller than a minimum limit value.

15. In an ultrasonic measuring device having at least one transmitter and receiver and at least one oscillator and resonator to transmit ultrasonic signals to an object and receive ultrasonic signals reflected from the object, a method of regulating the length of ultrasonic signals transmitted to the object based on the distance between the object and the device comprising the steps of transmitting a plurality of variable-length ultrasonic pulses to an object, determining for each of the plurality of transmitted pulses the transit time, receiving at least one diagnosis echo having a first length, the diagnosis echo corresponding to at least one transmitted pulse of the plurality of transmitted pulses, and regulating the length of each of the plurality of transmitted pulses such that the length of the at least one diagnosis echo is approximately proportional to the transit time of a preceding transmitted pulse.

16. The method according to claim 15, further comprising the step of increasing the pulse length of at least one of the plurality of transmitted pulses to a maximum value when the ratio of the length of the transit time of the preceding transmitted pulse to the length of the diagnosis echo is greater than a maximum limit value.

17. The method according to claim 15, further comprising the step of maintaining constant the pulse length of at least one of the plurality of transmitted pulses when the ratio of the length of the transit time of the preceding transmitted pulse to the length of the diagnosis echo is between a minimum limit value and a maximum limit value.

18. The method according to claim 15, further comprising the step of decreasing the pulse length of at least one of the plurality of transmitted pulses to a minimum value when the ratio of the length of the transit time of the preceding transmitted pulse to the length of the diagnosis echo is smaller than a minimum limit value.

19. An ultrasonic device for measuring a distance between the device and an object comprising at least one transmitter and receiver for transmitting ultrasonic signals and for receiving ultrasonic signals reflected from the object, at least one resonator and oscillator for generating variable-length ultrasonic signals, and electronic means including a timer and processor for varying the length of transmitted pulses such that the length of each of the transmitted pulses is approximately proportional to the transit time of the preceding transmitted pulse.

20. An ultrasonic device for measuring a distance between the device and an object comprising at least one transmitter and receiver for transmitting ultrasonic signals and for receiving ultrasonic signals reflected from the object and detecting diagnosis echoes, at least one resonator and oscillator for generating variable-length ultrasonic signals, and electronic means including a timer and processor for varying the length of transmitted pulses such that the length of at least one diagnosis echo is approximately proportional to the transit time of the preceding transmitted pulse.

* * * * *